(12) United States Patent
Dacey (10) Patent No.: US 11,842,657 B2
(45) Date of Patent: Dec. 12, 2023

(54) MAGNETIC LABELING KIT AND METHODS OF USE

(71) Applicant: Travis Dacey, Halifax (CA)

(72) Inventor: Travis Dacey, Halifax (CA)

( * ) Notice: Subject to any disclaimer, the term of this patent is extended or adjusted under 35 U.S.C. 154(b) by 211 days.

(21) Appl. No.: 17/107,052

(22) Filed: Nov. 30, 2020

(65) Prior Publication Data

US 2022/0172648 A1    Jun. 2, 2022

(51) Int. Cl.
| | | |
|---|---|---|
| G09F 3/02 | (2006.01) | |
| G09F 3/04 | (2006.01) | |
| H02B 1/06 | (2006.01) | |
| G09F 3/00 | (2006.01) | |
| G09F 3/03 | (2006.01) | |

(52) U.S. Cl.
CPC .............. *G09F 3/02* (2013.01); *G09F 3/0295* (2013.01); *G09F 3/037* (2013.01); *G09F 3/04* (2013.01); *H02B 1/066* (2013.01); *G09F 2003/023* (2013.01); *G09F 2003/0276* (2013.01)

(58) Field of Classification Search
CPC . H02B 1/48; H02B 1/46; H02B 1/066; H01H 9/18; G09F 2003/0276; G09F 2003/023; G09F 3/205; G09F 3/037; G09F 3/0295; G09F 3/02
See application file for complete search history.

(56) References Cited

U.S. PATENT DOCUMENTS

| | | | | |
|---|---|---|---|---|
| 970,529 | A * | 9/1910 | Miller | G09F 3/037 |
| | | | | 292/318 |
| 1,192,243 | A * | 7/1916 | Taylor | G09F 3/037 |
| | | | | 292/315 |
| 1,454,217 | A * | 5/1923 | Kerr | G09F 3/037 |
| | | | | 292/315 |
| 1,654,547 | A * | 1/1928 | Martineau | G09F 3/037 |
| | | | | 292/307 R |
| 4,033,057 | A * | 7/1977 | Jaffe | G09F 3/08 |
| | | | | 40/665 |
| 4,306,745 | A * | 12/1981 | Wenk | G09F 3/0352 |
| | | | | 292/318 |
| 4,470,173 | A * | 9/1984 | Adamson | B65D 77/185 |
| | | | | 24/17 AP |
| 5,031,943 | A * | 7/1991 | Scott | B65D 63/1081 |
| | | | | 292/307 R |
| 5,042,181 | A * | 8/1991 | Fortsch | H01B 7/368 |
| | | | | 292/307 R |
| 5,337,503 | A * | 8/1994 | Goby | G09F 3/0352 |
| | | | | 292/318 |

(Continued)

*Primary Examiner* — David R Dunn
*Assistant Examiner* — Christopher E Veraa
(74) *Attorney, Agent, or Firm* — Tim Hodgkiss; BUCKINGHAM DOOLITTLE BURROUGHS (57) ABSTRACT

A kit includes one or more pairs of matching color-coded attachment members and tags. The attachment member is configured to be selectively retained to an electrical wire entering an electrical service panel. The corresponding color-coded tag is configured to be attached, such as through magnetic means, to a door of the electrical service panel. The tag includes pre-printed text thereon, which provides descriptive information regarding the electrical circuit formed by the wire to which the attachment member is associated. As such, the color-coding allows a homeowner or technician to easily identify which electrical circuit is controlled by a particular electrical circuit breaker.

14 Claims, 7 Drawing Sheets

(56) References Cited

U.S. PATENT DOCUMENTS

| | | | | |
|---|---|---|---|---|
| 5,524,945 | A * | 6/1996 | Georgopoulos | G09F 3/037 292/307 R |
| 5,765,885 | A * | 6/1998 | Netto | B65D 77/185 292/318 |
| 5,949,336 | A * | 9/1999 | Deschenes | G09F 3/14 264/297.6 |
| 6,145,167 | A * | 11/2000 | Brentini | G09F 3/14 283/80 |
| 6,343,819 | B1 * | 2/2002 | Shiozaki | G09F 3/037 292/307 R |
| 6,667,091 | B1 * | 12/2003 | Castro Netto | G09F 3/037 428/161 |
| 6,845,577 | B1 * | 1/2005 | Downes | B65D 33/165 24/30.5 P |
| 7,454,854 | B2 * | 11/2008 | Riley | G09F 3/005 40/633 |
| 7,616,096 | B1 * | 11/2009 | Sorensen | H01H 71/04 340/815.4 |
| 8,087,190 | B1 * | 1/2012 | Rivera-Andrianakos | G09F 3/02 40/606.03 |
| 9,611,083 | B2 * | 4/2017 | Schuttler | B65D 63/1027 |
| 2002/0014426 | A1 * | 2/2002 | Durica | G09F 3/10 206/388 |
| 2004/0098896 | A1 * | 5/2004 | Goodin | G09F 3/037 40/633 |
| 2005/0155265 | A1 * | 7/2005 | Coleman-Chang | G09F 7/04 40/600 |
| 2015/0221242 | A1 * | 8/2015 | Cable | G09F 3/14 40/661.01 |
| 2017/0025046 | A1 * | 1/2017 | Butts | G09F 3/0295 |
| 2017/0113857 | A1 * | 4/2017 | Berglund | G09F 3/037 |
| 2018/0286289 | A1 * | 10/2018 | Liversidge | H01R 13/465 |
| 2018/0327155 | A1 * | 11/2018 | Groll | F16L 3/137 |
| 2019/0168937 | A1 * | 6/2019 | McDowell, III | H02G 3/32 |
| 2019/0323902 | A1 * | 10/2019 | Gao | H02G 3/32 |
| 2020/0059018 | A1 * | 2/2020 | Cerniglia | H01R 9/2475 |
| 2020/0090881 | A1 * | 3/2020 | Fields | H02J 3/14 |
| 2020/0394938 | A1 * | 12/2020 | Cerniglia | G09F 3/0295 |
| 2021/0398457 | A1 * | 12/2021 | Meyers | G09F 3/0295 |

* cited by examiner

MAGNETIC LABELING KIT AND METHODS OF USE

TECHNICAL FIELD

The various embodiments disclosed herein relate to labeling systems and methods thereof. In particular, the various embodiments disclosed herein relate to a kit that includes multiple sets of color-coded attachment members and magnetic color-coded tags to identify an item marked by the attachment member. More particularly, the various embodiments disclosed herein relate to a kit that includes multiple sets of ties and magnetic tags that are color-coded to each other, whereby the magnetic tags include pre-printed indicia thereon that describe or identify details regarding a component, such as an electrical wire, to which the associated color-coded tie is attached.

BACKGROUND

In the field of electrical wiring, in both new and existing home and building structures, a multitude of electrical wires extend throughout to interconnect one or more power sources to a variety of devices that require electrical power to operate. In addition, these electrical wires may be connected to a variety of electrical outlets, as well as a variety of hardwired appliances and systems, such as industrial machinery, lighting, furnaces, and air conditioners for example. Furthermore, these electrical wires are organized into separate electrical circuits that discreetly supply electrical power to the electrical devices, with each electrical circuit being controlled by one or more electrical circuit breaker switches to selectively switch the power that is applied to a given electrical circuit off and on. Often the electrical breaker switches are positioned and organized within an electrical breaker box or electrical service panel.

From time to time, a failure within the electrical system occurs, which requires an electrician to analyze the electrical wiring of the structure in order to efficiently and effectively identify the wires that are associated with a particular electrical device. As a first step in taking action to analyze the electrical failure, the electrical breaker box or electrical service panel is accessed to identify which particular circuit breaker should be switched off out of the voluminous number of other circuit breakers that are desired to be left on. Because there are numerous electrical breakers, each associated with a particular electrical circuit, it is imperative that there is some identification or description within the electrical panel or services box setting forth the mapping of which electrical breaker switch controls a particular circuit. For example, one electrical breaker switch may control power to a circuit to which an industrial stamping press is attached, or the electrical breaker switch may control power to a circuit to which a central air conditioning system is connected. Without knowing which circuit breaker switch is associated with a particular circuit, the electrician or homeowner is only left to guess, which is not acceptable.

To overcome this problem, many manufacturers of electrical panels or electrical service panels have a dedicated area thereon in which a handwritten note describes the particular electrical devices or equipment that are connected to a specific electrical breaker switch. For example, it is common for electrical panels or electrical service panels to have an area on the inside of their access door to allow an individual to write directly thereon, to describe which electrical breaker (associated with a particular circuit) is electrically connected to specific electrical devices and equipment. Unfortunately, many times these handwritten notes are written hastily in a rush, thus resulting in an illegible description, which is not helpful in guiding a technician when repairs or maintenance of the electrical wiring is conducted in the future. As a result, a technician must expend substantial time and effort to identify the particular breaker switch that controls power to the electrical circuit (and electrical equipment and devices connected thereto) that he or she wishes to enable or disable, which can be costly to the technician's clients.

A similar problem also occurs in the case of plumbing in both new and existing home and building structures, where it is common for plumbers to encounter a multitude of pipes forming a complex network that are routed across a plethora of areas. These pipes may carry incoming fluids such as water for drinking and for utility use, as well as greywater and wastewater, among other things. Thus, it is highly desirable to be able to quickly identify the failed and leaking pipe within the plumbing network so that the fluids flowing through them can be stopped to prevent or mitigate damage to the surrounding home or building structure.

Therefore, there is a need for a kit that includes a color-coded tie and tag, whereby the tag identifies details about the electrical wire (e.g. electrical circuit) or pipe to which an associated tie is attached. In addition, there is a need for a kit that includes a color-coded tie and tag, whereby the tag may include a label that includes pre-printed indicia thereon. Furthermore, there is a need for a kit that includes a color-coded tie and tag, whereby the tag may include an area thereon to receive preprinted indicia that may be selectively attached to the label. Moreover, there is a need for a kit that includes a color-coded tie and tag, whereby pre-printed indicia or information is disposed directly on the tag or is disposed on a label attached to the tag that is resistant to fading over time.

SUMMARY

In light of the foregoing, it is an aspect of the various embodiments disclosed herein to provide a labeling kit comprising an attachment member configured to be retained to a working member; and a tag including indicia thereon, wherein the tag includes a fastening member for attachment to a fixed member; and wherein the attachment member and the tag are color-matched to each other.

BRIEF DESCRIPTION OF THE DRAWINGS

These and other features and advantages of the various embodiments disclosed herein will become better understood with regard to the following description, accompanying drawings, and appended claims, wherein:

DETAILED DESCRIPTION

Figure 1A:
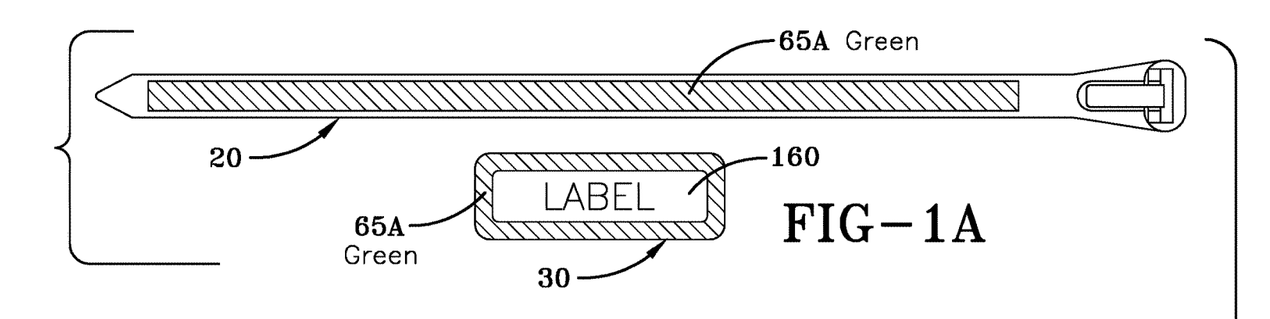
FIG. 1A is a top plan view of a color-coded (Green) attachment member and tag in accordance with the concepts of the various embodiments disclosed herein.
Figure 1B:
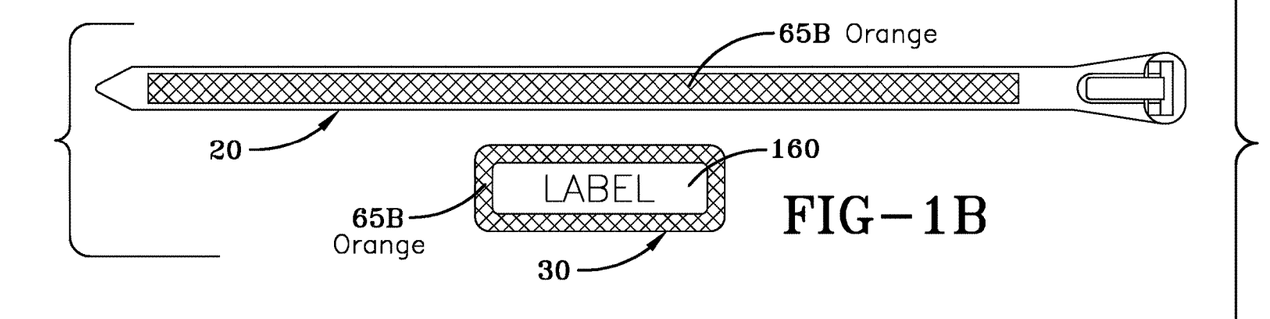
FIG. 1B is a top plan view of a color-coded (Orange) attachment member and tag in accordance with the concepts of the various embodiments disclosed herein.
Figure 1C:
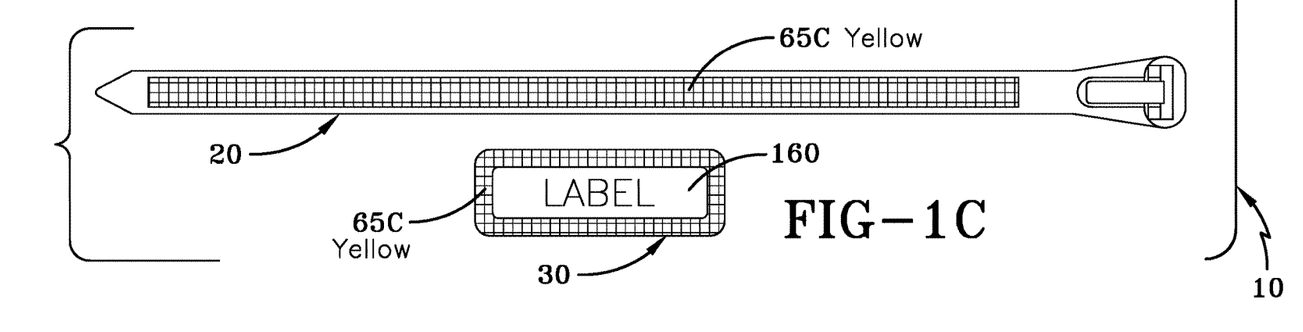
FIG. 1C is a top plan view of a color-coded (Yellow) attachment member and tag in accordance with the concepts of the various embodiments disclosed herein.
Figure 9:
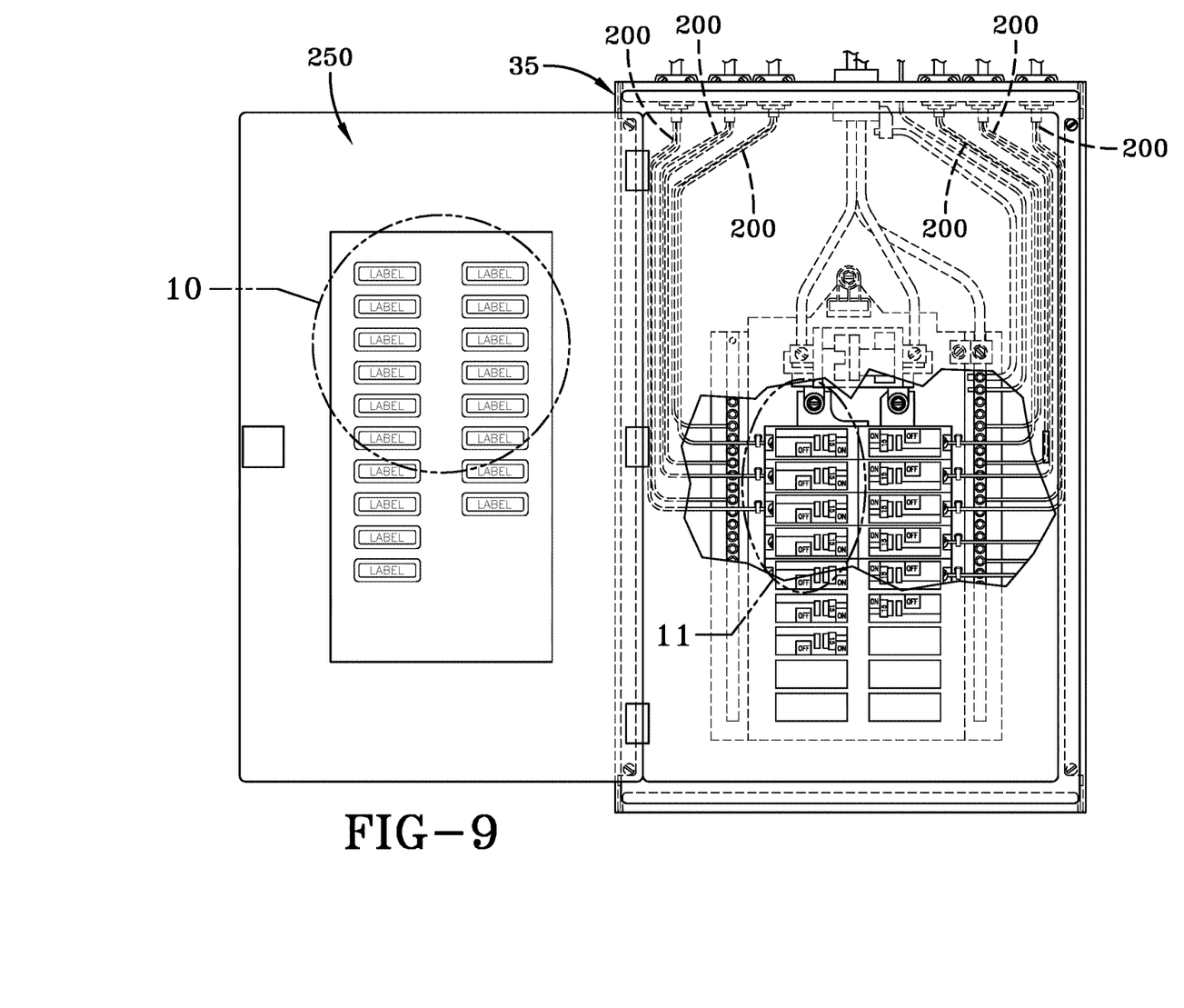
FIG. 9 is an elevational view of an electrical service panel with an open access door, whereby the electrical service panel contains two columns of electrical breaker switches attached to electrical circuits to which color-coded attachment members are connected, while the access door includes associated color-coded tags with labels including indicia identifying the electrical circuits thereon in accordance with the concepts of the various embodiments disclosed herein.

A magnetic labeling kit that incorporates the concepts of the various embodiments herein is referred to by numeral 10, as shown in FIGS. 1A-C. The labeling kit 10 includes pairs of matching color-coded (shown by cross-hatching in the Figs.) attachment members 20 and tags 30, to coordinate the identification of working members, such as electrical wires forming electrical circuits, to which the attachment member 20, such as a zip-tie, is retained. The tags 30 include printed identifying indicia/information that describes any desired characteristic associated with a particular electrical circuit/electrical wire that is marked by an attachment member 20. For example, such identifying indicia includes, but is not limited to information regarding the type of electrical appliances or systems (e.g. refrigerator, stamping press) that are connected to the electrical circuit, the location of the electrical circuit within a home or building (e.g. second floor bedrooms), and the like. To facilitate the association between a matching set of color-coded attachment member 20 and tag 30, the tag 30 is attached to a door or a frame of an electric junction box or electrical service panel 35 for example through magnetic or adhesive means, as shown in FIG. 9. It should be appreciated that while the kit 10 and its associated attachment members 20 and tags 30 are discussed herein as being used to identify electrical wires and electrical circuits, such should not be construed as limiting, as the kit 10 may be utilized to identify any desired article or component (i.e. working member). For example, the working member may include pipes, such as water supply pipes, grey water pipes, wastewater pipes, and other related plumbing fixtures, as well as pipes, hoses, and conduits that carry any desired material.

Figures 2, 3:
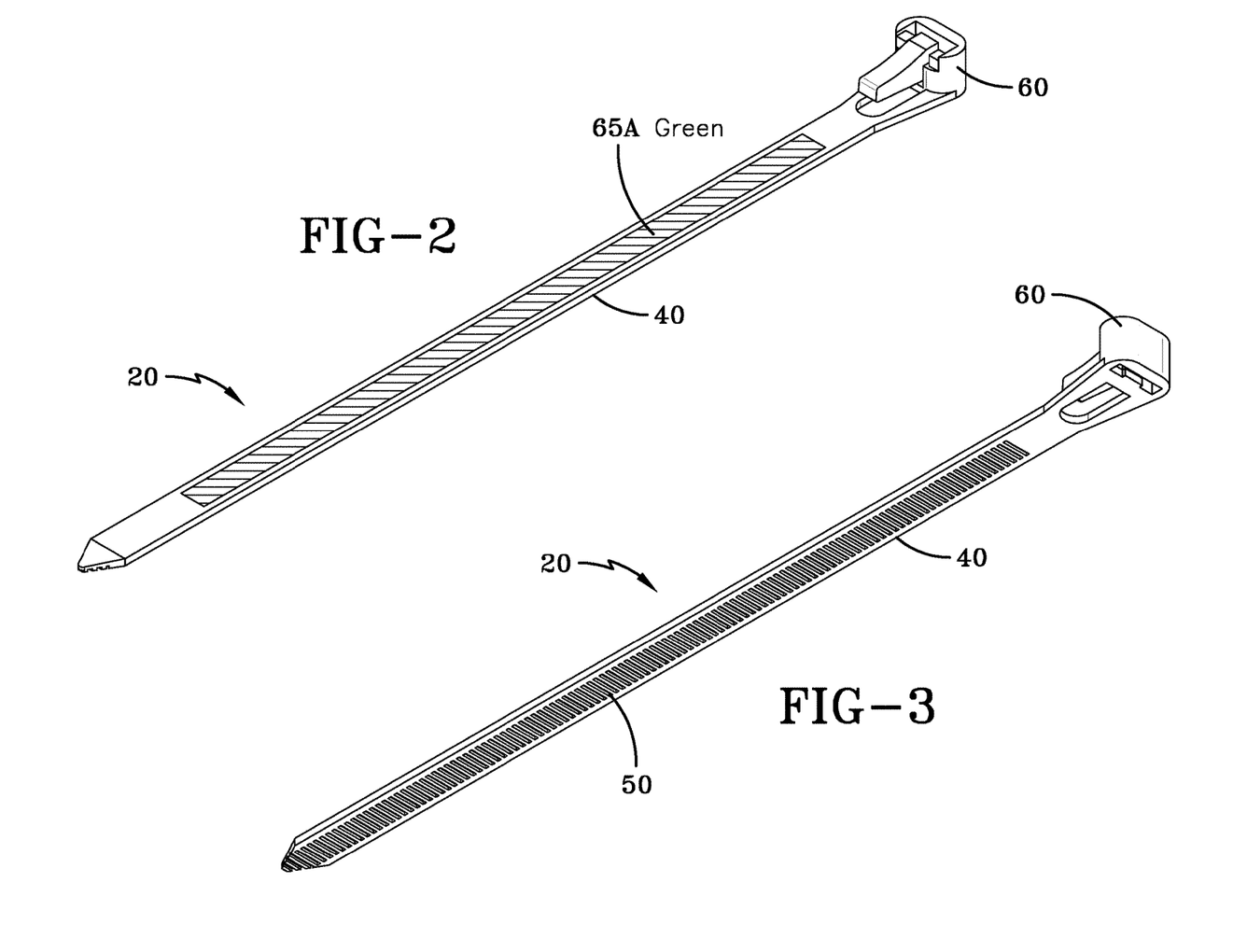
FIG. 2 is a perspective view of the color-coded (Green) attachment member in accordance with the concepts of the various embodiments disclosed herein.
FIG. 3 is a perspective view of the color-coded (Green) attachment member of FIG. 6 in accordance with the concepts of the various embodiments disclosed herein.
Figure 4:
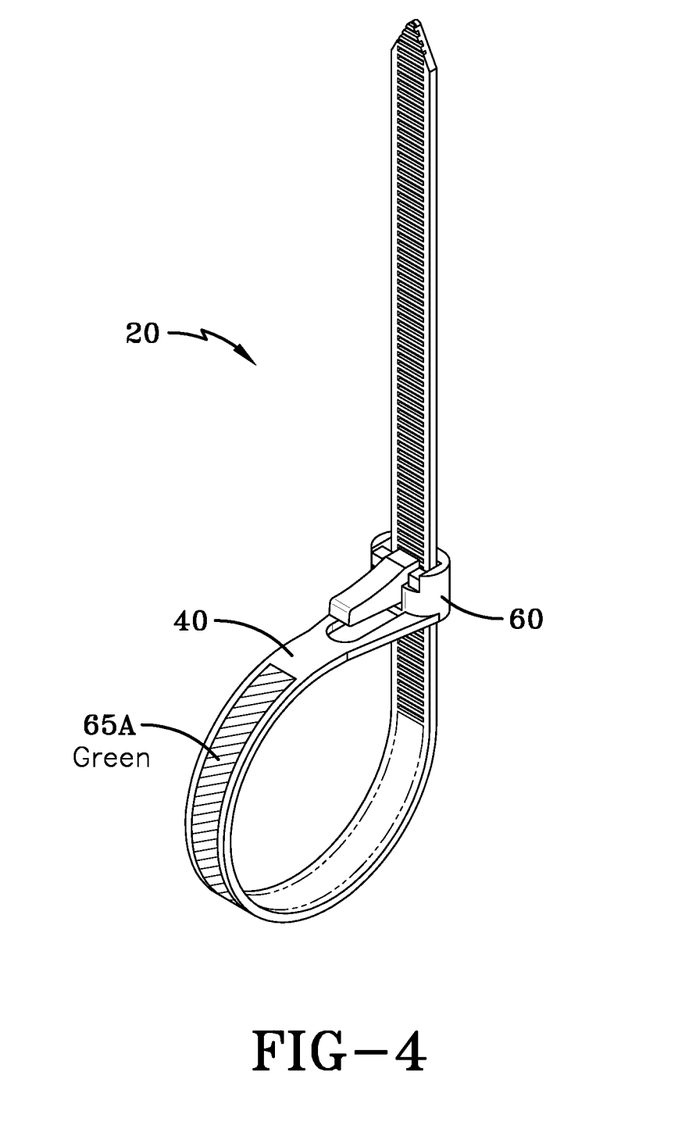
FIG. 4 is another perspective view of the color-coded (Green) attachment member of FIG. 6 in accordance with the concepts of the various embodiments disclosed herein.
Figure 5:
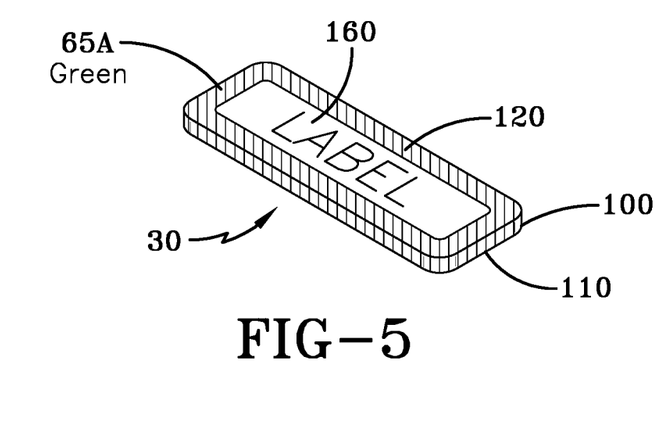
FIG. 5 is a perspective view of a color-coded (Green) tag having a pre-printed label attached thereto in accordance with the concepts of the various embodiments disclosed herein.

The attachment member 20, as shown in FIGS. 2-4, may comprise a lockable tie, such as a zip-tie, that can be attached to the working member. As previously discussed, the working member may comprise any article or component of a machine or system. In particular, the attachment member 20 may include an elongated body 40 that includes a fastening interface 50 and a fastener body 60, whereby the fastening interface 50 may be selectively locked or attached to the fastener body 60 at a desired position. In some embodiments, the fastener body 60 may be configured to allow the user to selectively lock and unlock the fastener interface 50 to facilitate the attachment and removal of the attachment member 20 from the working member. In other embodiments, the fastener body 60 may be configured such that the fastening interface 50 cannot be released once the fastening interface 50 is initially attached to the fastener body 60. In still other embodiments, the attachment member 20 may comprise an endless band or loop for example that is configured to be fitted around the working member, such as an electrical wire or pipe for example. In alternative embodiments, the attachment member 20 may comprise an elongated body terminated by ends for tying around the working member. It should be appreciated that the attachment member 20 may be formed of any suitable material, including but not limited to, polymeric material such as plastic, as well as rubber, silicone, and composites thereof.

In some embodiments, the color-coded portion of the attachment member 20 may be integral with the material forming the attachment member 20, or alternatively the color-coded portion may be a discrete or separate section of the attachment member 20. In still other embodiments, the discrete color-coded section may be provided unattached to the attachment member 20 within the kit 10 and then be subsequently attached to the attachment member 20 by the user such as by an adhesive or magnetic backing. The cross-hatched section 65A shown in the Figs. denotes that the attachment member 20 is colored "green", while other cross-hatched sections 65B and 65C denote colors "orange" and "yellow" respectively. It is contemplated that any number of colors and patterns of colors may be used by the attachment members 20 and the tags 30 of the kit 10.

The tag 30, as shown in FIGS. 5-8, includes a body 100 having opposed surfaces 110 and 120. The body 100 may be formed from any suitable material, including but not limited to, polymeric material such as plastic, as well as metal, wood, and the like. In addition, the body 100 of the tag 30 may have any desired shape, such as a rectilinear shape, a curvilinear shape, or a shape that is a combination thereof. Furthermore, the body 100 of the tag 30 is color-coded to match an associated or corresponding attachment member 20 to form a matching pair, such as those shown in FIGS. 1A, 1B, and 1C respectively. Accordingly, the cross-hatched section 65A of the tag 30 shown in FIG. 1A denotes that the tag 30 is colored "green", while the other cross-hatched sections 65B and 65C of the tag 30 shown in FIGS. 1B and 1C denote colors "orange" and "yellow" respectively. It is contemplated that any number of colors, as well as any pattern/arrangement of colors, may be used by the attachment members 20 and the tags 30 of the kit 10 to create matching color-coded pairs. It should be appreciated that any portion of the tag 30 may be color-coded. For example, the body 100 of the tags 30 may be the same color, such as black, with only a portion of the body 100 of the tag 30 being color-coded to the attachment member 20. In some embodiments, the tag 30 may be color coded to the attachment member 20 through the application of a colored indicia or section, attached through adhesive or magnetic means for example.

Figure 6:
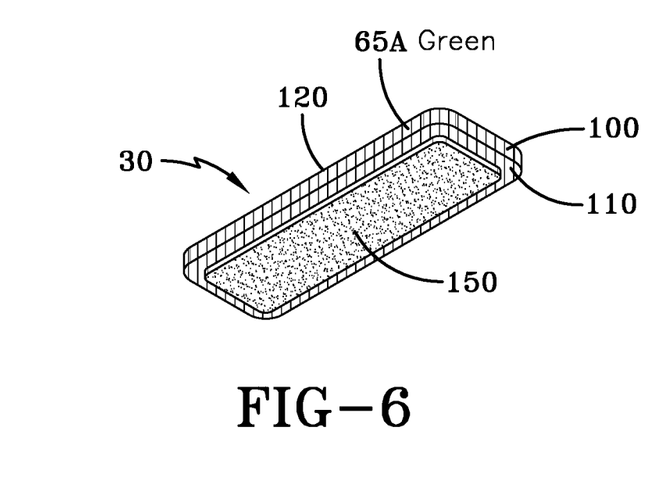
FIG. 6 is another perspective view of the color-coded (Green) tag of FIG. 2 in accordance with the concepts of the various embodiments disclosed herein.
Figure 7:
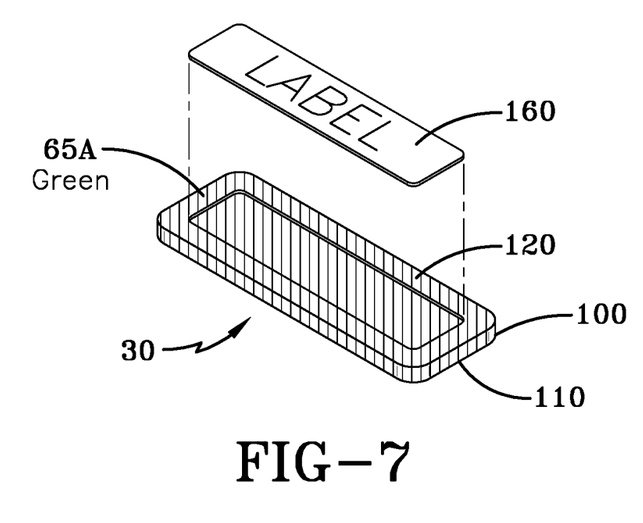
FIG. 7 is still yet another perspective view of a color-coded (Green) tag of FIG. 2 with the label removed in accordance with the concepts of the various embodiments disclosed herein.
Figure 8:
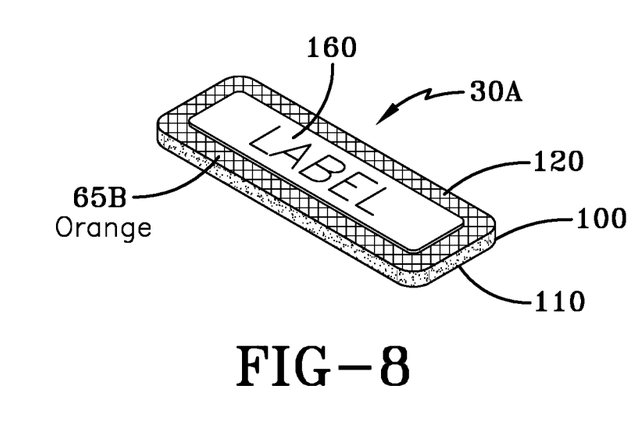
FIG. 8 is a perspective view of another color-coded (Orange) tag with a pre-printed label attached thereto in accordance with the concepts of the various embodiments disclosed herein.

Continuing, the surface 110 of the tag 30 is configured to carry a fastening member 150 thereon, as shown in FIG. 6, which may include one or more magnets or adhesive strips, for example. The opposed surface 120 of the tag 30 is configured to include identifying indicia, such a pre-printed text that includes any desired information. For example, the pre-printed text may include information that explains or provides information about the electrical wire itself, the electrical circuit, or the electrical devices and systems that are attached thereto, as well as combinations thereof. Similarly, the pre-printed text may include information regarding the water pipes/drainage pipes/sewer pipes themselves, plumbing routes to which a pipe is connected, or the fixtures, devices, or systems to which the pipe fluidly communicates, for example. The identifying indicia or information may be engraved or embossed into the surface 120 of the tag 30, or the identifying indicia or information may be included on a label 160 that is capable of attachment to the surface 120 of the tag 30, such as through adhesive or magnetic attachment, for example. It should be appreciated that the kit 10 may include a plurality of different pre-printed indicia or information on the tags 30 or on the labels 160, such as "washer and dryer", "machine shop", "air conditioner", "living room", and the like, so as to identify the electrical circuits that are identified by a color-matched attachment member 20.

It should be appreciated that in some embodiments, the body 100 of the tag 30 may be configured as magnetic tape, whereby the surface 110 is a magnetic surface and the surface 120 is color-coded and includes the pre-printed indicia or information thereon as previously discussed.

Figure 10:
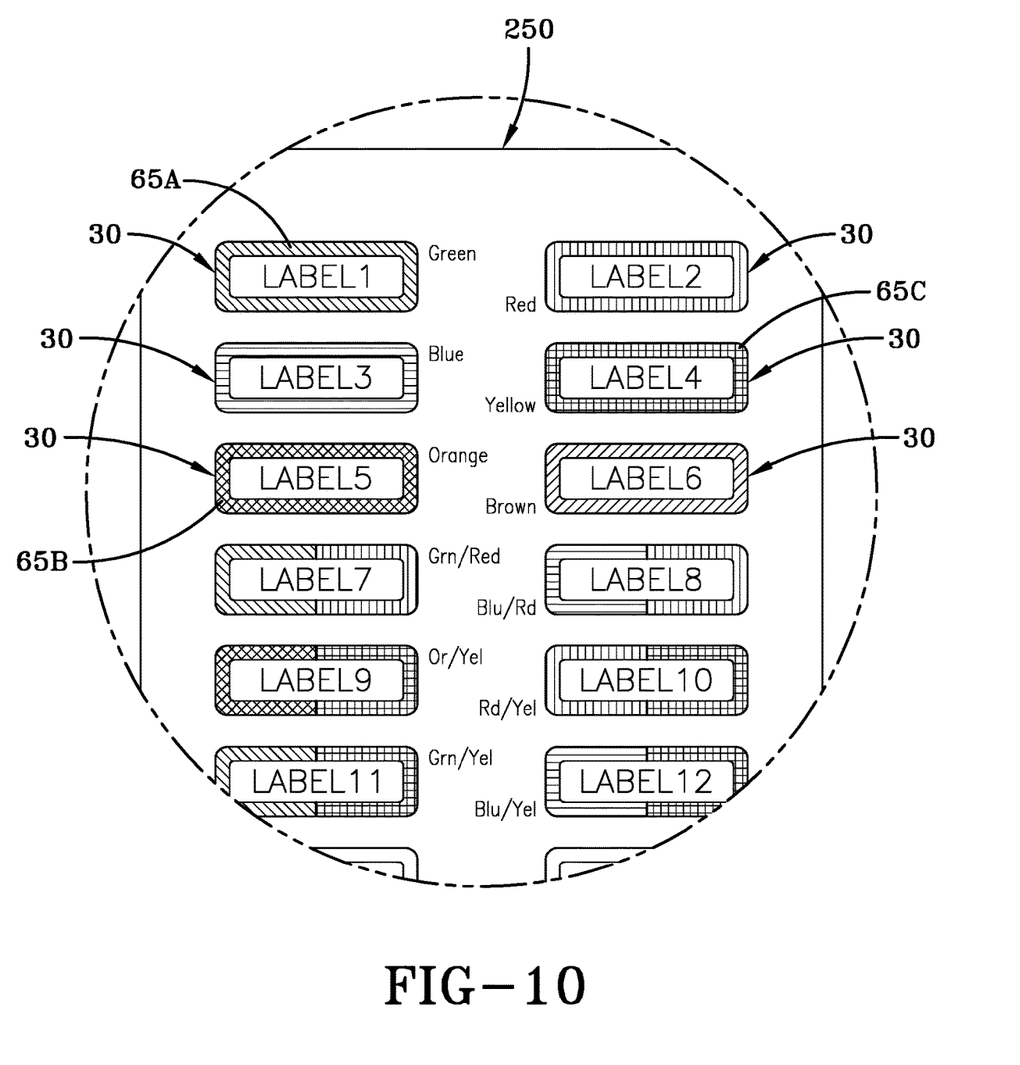
FIG. 10 is an inset view of the door of the electrical service panel shown in FIG. 9, showing a plurality of color-coded tags in accordance with the concepts of the various embodiments disclosed herein.
Figure 11:
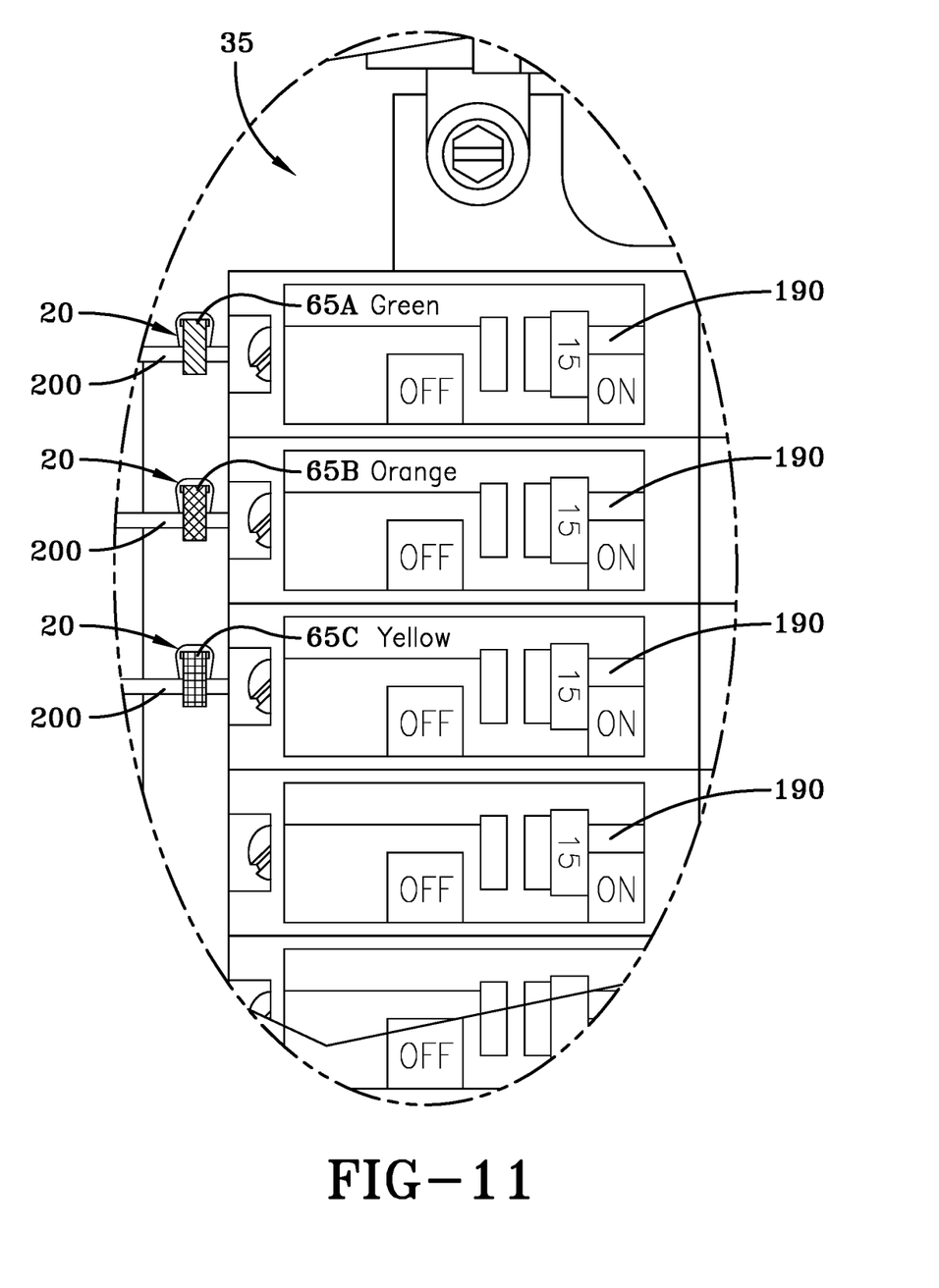
FIG. 11 is an inset view of the upper-left portion of the electrical service panel shown in FIG. 9, whereby multiple electrical circuits are identified by color-coded attachment members in accordance with the concepts of the various embodiments disclosed herein.

The following discussion presents the manner in which one or more pairs of matching color-coded attachment members 20 and tag 30 of the kit 10 are utilized to provide information relating various electrical wires or electrical circuits 200 entering the electrical service panel 35 as shown in FIGS. 9-11. However, such example should not be construed as limiting, as the attachment members 20 and tags 30 may be used in any other context.

As previously discussed, color-coding is used to associate or match a particular tag 30 having descriptive indicia thereon with a particular attachment member 20 that is retained to the wire 200 forming an electrical circuit entering the electrical service panel 35. The informative indicia provided by the tag 30 allows a user or electrician to determine which electrical circuit breaker 190 controls power to a given electrical circuit 200. Thus during use, a user selects one of a plurality of color-coded (or pattern-coded) pairs of attachment members 20 and tags 30 from the kit 10. Once a single pair of color-coded attachment members 20 and tags 30 is selected, the user attaches the tag 30, such as through the magnetic attachment, to a metallic door 250 of the electrical service panel 35. Once the tag 30 is placed on the door 250, the user can affix the attachment member 20 to the electrical wire 200 associated with the circuit that is identified by the identifying indicia or information disposed on the tag 30.

It should be appreciated that in some embodiments, the kit 10 may include attachment members 20 and tags 30 having pre-printed indicia attached thereon. However, in other embodiments, the kit 10 may include attachment members 20 and tags 30, whereby the indicia is printed on separate labels 160 for subsequent attachment to the tags 30. Furthermore, it is contemplated that the kit 10 may include the aforementioned components but may also include an electrical service panel 35.

It is further contemplated that the embodiments of the kit 10 disclosed herein may be used both in new home and building construction, as well as in existing home and business construction. Particularly in the case of new construction, often an incoming wire for the electrical service panel 35 is identified by handwriting that is directly written on the wire's insulation, such as through the use of a marker. During the wire installation process, the wire's insulation is often cut off to expose part of the electrical conductor for connection to the electrical breaker 190 that is within the electrical panel 35. Through this process, the information on the wire's insulation is lost, and unless the individual re-marks the insulation with the identifying information, the information is lost forever. As a result, subsequent workers on the electrical panel are left to guess the electrical circuit and electrical devices to which the wire is associated or connected when it is attached to a breaker switch 190 in the panel 35. This process wastes time and is inefficient. Accordingly, the attachment member 20 disclosed herein overcomes this problem by allowing the user to reattach the attachment member 20 or slide up the attachment member 20 encircling the wire 200 onto the remaining insulation of the wire 200 after the insulation of the wire 200 has been cut and removed by the user. As a result, the identifying information associated with the wire is always present with the wire 200. When the wire 200 is connected to the electrical breaker switch 190, the tag 30 is attached to the panel door 250 to display the information about the wire 200 that is associated with the corresponding color-coded attachment member 20.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A labeling kit comprising:
an attachment member having an elongated member body and a fastener body, said elongated member body configured to be removably attached through said fastener body to allow said attachment member to be removably retained about a first member, wherein an elongated coded section is carried along a length of said elongated member body; and
a tag including a tag body having a fastening member for attachment to a second member;
wherein said elongated coded section and said tag body are matched by at least one characteristic, and
wherein said elongated coded section is configured to be magnetically attached to said elongated member body.

2. The kit of claim 1, wherein the first member comprises an electrical wire or a pipe.

3. The labeling kit of claim 1, wherein the second member comprises a door of an electrical service panel.

4. The labeling kit of claim 1, wherein said elongated member body is configured to be secured to said fastener body at a plurality of positions along the length of said elongated member body.

5. The labeling kit of claim 1, wherein said fastening member comprises a magnet.

6. The labeling kit of claim 1, further comprising indicia that is configured to be magnetically attached to said tag body.

7. The labeling kit of claim 6, wherein said indicia is carried within a recessed cavity provided by said tag body.

8. The labeling kit of claim 6, wherein when said indicia is attached to said tag body, said at least one characteristic provided by said tag body surrounds the periphery of said indicia.

9. The labeling kit of claim 1, further comprising indicia that is integral with said tag body.

10. The labeling kit of claim 1, wherein said at least one characteristic comprises a pattern of colors.

11. The labeling kit of claim 1, further comprising:
an electrical service panel having a door to which said tag is magnetically attached.

12. The labeling kit of claim 1, wherein said at least one characteristic comprises one or more of a color or a pattern.

13. The labeling kit of claim 1, wherein said elongated coded section extends along a majority of the length of said elongated member body.

14. The labeling kit of claim 1, wherein said attachment member and said elongated coded section are flexible.

* * * * *